(12) United States Patent
Croutwater et al.

(10) Patent No.: US 10,713,241 B2
(45) Date of Patent: *Jul. 14, 2020

(54) WEIGHTING AND EXPANDING QUERY TERMS BASED ON LANGUAGE MODEL FAVORING SURPRISING WORDS

(71) Applicant: International Business Machines Corporation, Armonk, NY (US)

(72) Inventors: Kyle L. Croutwater, Chapel Hill, NC (US); Vikrant Verma, Cary, NC (US); Le Zhang, Durham, NC (US); Zhe Zhang, Cary, NC (US)

(73) Assignee: International Business Machines Corporation, Armonk, NY (US)

(*) Notice: Subject to any disclaimer, the term of this patent is extended or adjusted under 35 U.S.C. 154(b) by 297 days.

This patent is subject to a terminal disclaimer.

(21) Appl. No.: 15/619,689

(22) Filed: Jun. 12, 2017

(65) Prior Publication Data

US 2018/0232374 A1    Aug. 16, 2018

Related U.S. Application Data

(63) Continuation of application No. 15/430,597, filed on Feb. 13, 2017.

(51) Int. Cl.
*G06F 16/24* (2019.01)
*G06F 16/2452* (2019.01)
*G06F 16/242* (2019.01)
*G06F 16/2455* (2019.01)
(Continued)

(52) U.S. Cl.
CPC ...... *G06F 16/24522* (2019.01); *G06F 16/243* (2019.01); *G06F 16/2455* (2019.01); *G06F 40/247* (2020.01); *G06F 40/289* (2020.01)

(58) Field of Classification Search
CPC .......... G06F 16/24522; G06F 16/2455; G06F 16/243; G06F 17/2775; G06F 17/2795; G06F 40/247; G06F 40/289
See application file for complete search history.

(56) References Cited

U.S. PATENT DOCUMENTS 6,477,524 B1 * 11/2002 Taskiran ............. G06F 16/3346
7,958,136 B1 *  6/2011 Curtis ................... G06F 16/313
                                                                707/758
8,122,043 B2     2/2012 Buckley et al.
(Continued)

OTHER PUBLICATIONS

"List of IBM Patents or Patent Applications Treated as Related," Letter from Leslie A. Van Leeuwen, Jun. 12, 2017, 1 page.
(Continued)

*Primary Examiner* — Alicia M Willoughby
(74) *Attorney, Agent, or Firm* — Van Leeuwen & Van Leeuwen; Ingrid M. Foerster (57) ABSTRACT

An approach is provided that receives a question at a question answering (QA) system. The question includes a number of words. The approach operates by calculating weights that correspond to search terms included in the plurality of words. The search terms include the plurality of words and may include terms that are one or more sequences of adjacent words included in the question. Based on the calculated weights and the words in the question, the approach generates a query that is used to search a corpus that is managed by the QA system with the search resulting in one or more search results.

4 Claims, 8 Drawing Sheets

(51) Int. Cl.
*G06F 40/247* (2020.01)
*G06F 40/289* (2020.01)

(56) References Cited

U.S. PATENT DOCUMENTS

| | | | | |
|---|---|---|---|---|
| 8,326,861 | B1* | 12/2012 | Ainslie | G06F 16/335 |
| | | | | 707/768 |
| 8,401,841 | B2 | 3/2013 | Roitblat et al. | |
| 2003/0229624 | A1* | 12/2003 | Petrisor | G06F 16/951 |
| 2008/0052273 | A1* | 2/2008 | Pickens | G06F 16/3344 |
| 2009/0248661 | A1 | 10/2009 | Bilenko et al. | |
| 2009/0307198 | A1* | 12/2009 | Zhang | G06F 16/9537 |
| 2010/0185661 | A1* | 7/2010 | Malden | G06Q 10/06 |
| | | | | 707/769 |
| 2012/0233128 | A1* | 9/2012 | Solmer | G06K 9/00442 |
| | | | | 707/661 |
| 2013/0086509 | A1* | 4/2013 | Satyanarayana | G06F 16/3322 |
| | | | | 715/781 |
| 2013/0091165 | A1* | 4/2013 | Han | G06F 16/3349 |
| | | | | 707/769 |
| 2014/0304257 | A1* | 10/2014 | Ben Shahar | G06F 16/319 |
| | | | | 707/723 |
| 2015/0228279 | A1* | 8/2015 | Biadsy | G10L 15/26 |
| | | | | 704/235 |
| 2015/0331935 | A1* | 11/2015 | Jamrog | G06F 17/271 |
| | | | | 707/722 |
| 2016/0217128 | A1* | 7/2016 | Baum | G06F 40/289 |
| 2016/0267904 | A1* | 9/2016 | Biadsy | G10L 15/08 |
| 2018/0198827 | A1* | 7/2018 | Eifler | H04L 63/101 |

OTHER PUBLICATIONS

Croutwater et al., "Weighting and Expanding Query Terms Based on Language Model Favoring Surprising Words," U.S. Appl. No. 15/430,597, filed Feb. 13, 2017, 41 pages.

* cited by examiner

WEIGHTING AND EXPANDING QUERY TERMS BASED ON LANGUAGE MODEL FAVORING SURPRISING WORDS

BACKGROUND OF THE INVENTION

Description of Related Art

A challenge in Question Answering (QA) systems is that relevant passages and documents with the correct answer from an open domain query are not always returned with a high rank. The goal is to improve the query generation step in formulating the query for a search for open domain question answer systems. Traditional QA systems formulate a query based on the terms in the question, after performing operations like dropping common stop words (such as "the," "in," etc.), weighting (boosting) certain terms, deciding whether search terms are mandatory or optional, and performing an expansion on terms to automatically include related terms, such as synonyms, etc. There is an art to query formulation, as sometimes trying to expand queries, by including synonyms for example, can generate noise in the returned passages and result in less useful passages being returned by the QA system. Sometimes terms are dropped, because they are very common, in cases where they should have been included in the search because such terms are a key idea in the search (such as the word "not," which is sometimes dropped from search terms). A challenge in QA system development, therefore, is to improve query formulation by selectively boosting and expanding certain terms without adding undue noise by including too many search terms.

SUMMARY

An approach is provided that receives a question at a question answering (QA) system. The question includes a number of words. The approach operates by calculating weights that correspond to search terms included in the plurality of words. The search terms include the plurality of words and may include terms that are one or more sequences of adjacent words included in the question. Based on the calculated weights and the words in the question, the approach generates a query that is used to search a corpus that is managed by the QA system with the search resulting in one or more search results.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention will be apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings, wherein.

DETAILED DESCRIPTION

FIGS. 1-8 describe an approach that provides weights of search terms that are used when searching a corpus managed by a question answering (QA) system. A statistical language model is a probability distribution of sequences of words. This approach uses a formula, based on the log likelihood statistics (a derivative of the probability) from a language model generated for the corpus from Unigrams, Bigrams . . . n-grams for words. (in one embodiment, the approach utilizes the Berkeley Language model). Below is the method we are using to determine the term weights for this invention, and rules for applying those weights to decide stop words and mandatory terms.

The approach processes n-gram models using the following algorithm, where W=the weight of the term, n=the number of grams, $\alpha_i$=constant value for gram (i), and $L_i$=the likelihood of the term (likelihood of single word for unigram, two adjacent words for bigram, etc.).

$$W = \sum_{i=1}^{n} \alpha_i * \text{abs}(L_i)$$

For any given corpus, the constants to use can be determined by training and testing based on the documents in the corpus (document database). Two thresholds are used ($t_1$ and $t_2$) so that if a term exceeds (is greater than) the first threshold ($t_1$) then the approach ensures that the term is not removed by a stop list (e.g., list of words commonly removed from a search, etc.). If the term exceeds the second threshold ($t_2$), then the approach ensures that the term is included as a mandatory term in the search.

The idea behind this approach is if unlikely words are included in a question (relative to works preceding them), they may be particular relevant and boosted in a variety of ways. The weights are calculated using the formula above based on log likelihood. These weights are added to the Lucene query.

For example, consider the open language query: "Who did Pakistan's Supreme Court acquit of hijacking charges dating from an 1999 army coup?"

In traditional QA systems, the document query that would result from the example question might appear as:

"+contents:armi +contents:charg +contents:coup +contents:pakistan +contents:1999 +contents:suprem +contents:court contents:did contents:acquit contents:hijack contents:date contents:from spanNear([contents:did, contents:pakistan], 2, false)^0.4 spanNear([contents: pakistan, span Near([contents:suprem, contents:court], 2, true)], 2, false)^0.4 spanNear([spanNear([contents: suprem, contents:court], 2, true), contents:acquit], 2, false)^0.4 spanNear([contents:acquit, contents:hijack], 2, false)^0.4 spanNear([contents:hijack, contents: charg], 2, false)^0.4 spanNear([contents:charg, contents:date], 2, false)^0.4 spanNear([contents:date, contents:from], 2, false)^0.4 spanNear([contents:from, contents:1999], 2, false)^0.4 spanNear([contents:1999, contents:armi], 2, false)^0.4 spanNear([contents:armi, contents:coup], 2, false)^0.4

And the resulting passage query in a traditional QA system might appear as:

contents:pakistan contents:suprem contents:court contents:did contents:acquit contents:hijack contents:charg contents:date contents:from contents:1999 contents: armi contents:coup spanNear([contents:did, contents: pakistan], 2, false)^0.4 spanNear([contents:pakistan, span Near([contents:suprem, contents:court], 2, true)], 2, false)^0.4 spanNear([spanNear([contents:suprem, contents:court], 2, true), contents:acquit], 2, false)^0.4 spanNear([contents:acquit, contents:hijack], 2, false) ^0.4 spanNear([contents:hijack, contents:charg], 2, false)^0.4 spanNear([contents:charg, contents:date], 2, false)^0.4 spanNear([contents:date, contents:from], 2, false)^0.4 spanNear([contents:from, contents:1999], 2, false)^0.4 spanNear([contents:1999, contents:armi], 2, false)^0.4 spanNear([contents:armi, contents:coup], 2, false)^0.4 using passage search method: CONTEXT Using the approach described herein, the document and passage queries are shown with weightings that reflect the surprise nature of one or more of the search terms, with noted weightings highlighted in bold below:

Document query using approach described herein:
+contents:armi^1.8219616 +contents:charg^1.5046515 +contents:coup^2.0959115 +contents:pakistan^2.1257643 +contents:1999^2.6136165 +contents:suprem^1.8141896 +contents:court^1.7127338 contents:did^1.9036298 contents:acquit^2.4188824 contents:hijack^2.9932864 contents:date^2.2353313 contents:from^1.0671548 spanNear([contents:did, contents: pakistan], 2, false)^0.4 spanNear([contents:pakistan, span Near([contents:suprem, contents:court], 2, true)], 2, false)^0.4 spanNear([spanNear([contents:suprem, contents:court], 2, true), contents:acquit], 2, false)^0.4 spanNear([contents:acquit, contents:hijack], 2, false)^0.4 spanNear([contents:hijack, contents: charg], 2, false)^0.4 spanNear([contents:charg, contents:date], 2, false)^0.4 spanNear([contents:date, contents:from], 2, false)^0.4 spanNear([contents:from, contents:1999], 2, false)^0.4 spanNear([contents:1999, contents:armi], 2, false)^0.4 spanNear([contents:armi, contents:coup], 2, false)^0.4

Passage query using approach described herein:
contents:pakistan^2.1257643 contents:suprem^ 1.8141896 contents:court^ 1.7127338 contents:did^ 1.9036298 contents:acquit^2.4188824 contents:hijack^2.9932864 contents:charg^ 1.5046515 contents:date^2.2353313 contents:from^ 1.0671548 contents:1999^2.6136165 contents:armi^ 1.8219616 contents:coup^2.0959115 spanNear([contents:did, contents: pakistan], 2, false)^0.4 spanNear([contents:pakistan, spanNear([contents:suprem, contents:court], 2, true)], 2, false)^0.4 spanNear([spanNear([contents:suprem, contents:court], 2, true), contents:acquit], 2, false)^0.4 spanNear([contents:acquit, contents:hijack], 2, false) ^0.4 spanNear([contents:hijack, contents:charg], 2, false)^0.4 spanNear([contents:charg, contents:date], 2, false)^0.4 spanNear([contents:date, contents:from], 2, false)^0.4 spanNear([contents:from, contents:1999], 2, false)^0.4 spanNear([contents:1999, contents:armi], 2, false)^0.4 spanNear([contents:armi, contents:coup], 2, false)^0.4 using passage search method: CONTEXT The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Java, Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Figure 1:
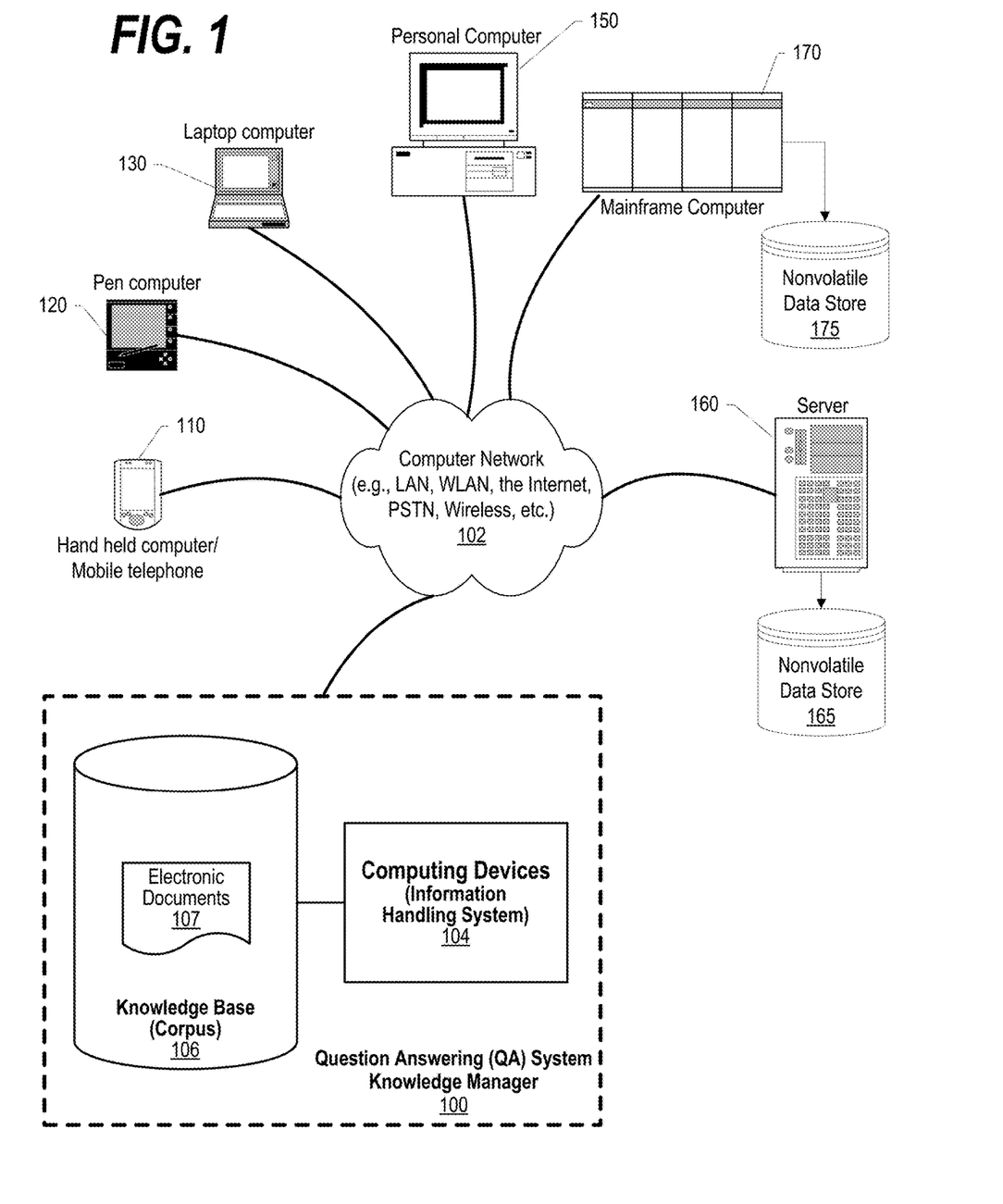
FIG. 1 depicts a network environment that includes a knowledge manager that utilizes a knowledge base.

FIG. 1 depicts a schematic diagram of one illustrative embodiment of a question/answer creation (QA) system 100 in a computer network 102. QA system 100 may include a knowledge manager computing device 104 (comprising one or more processors and one or more memories, and potentially any other computing device elements generally known in the art including buses, storage devices, communication interfaces, and the like) that connects QA system 100 to the computer network 102. The network 102 may include multiple computing devices 104 in communication with each other and with other devices or components via one or more wired and/or wireless data communication links, where each communication link may comprise one or more of wires, routers, switches, transmitters, receivers, or the like. QA system 100 and network 102 may enable question/answer (QA) generation functionality for one or more content users. Other embodiments of QA system 100 may be used with components, systems, sub-systems, and/or devices other than those that are depicted herein.

QA system 100 may be configured to receive inputs from various sources. For example, QA system 100 may receive input from the network 102, a corpus of electronic documents 107 or other data, a content creator, content users, and other possible sources of input. In one embodiment, some or all of the inputs to QA system 100 may be routed through the network 102. The various computing devices on the network 102 may include access points for content creators and content users. Some of the computing devices may include devices for a database storing the corpus of data. The network 102 may include local network connections and remote connections in various embodiments, such that knowledge manager 100 may operate in environments of any size, including local and global, e.g., the Internet. Additionally, knowledge manager 100 serves as a front-end system that can make available a variety of knowledge extracted from or represented in documents, network-accessible sources and/or structured data sources. In this manner, some processes populate the knowledge manager with the knowledge manager also including input interfaces to receive knowledge requests and respond accordingly.

In one embodiment, the content creator creates content in electronic documents 107 for use as part of a corpus of data with QA system 100. Electronic documents 107 may include any file, text, article, or source of data for use in QA system 100. Content users may access QA system 100 via a network connection or an Internet connection to the network 102, and may input questions to QA system 100 that may be answered by the content in the corpus of data. As further described below, when a process evaluates a given section of a document for semantic content, the process can use a variety of conventions to query it from the knowledge manager. One convention is to send a well-formed question. Semantic content is content based on the relation between signifiers, such as words, phrases, signs, and symbols, and what they stand for, their denotation, or connotation. In other words, semantic content is content that interprets an expression, such as by using Natural Language (NL) Processing. Semantic data 108 is stored as part of the knowledge base 106. In one embodiment, the process sends well-formed questions (e.g., natural language questions, etc.) to the knowledge manager. QA system 100 may interpret the question and provide a response to the content user containing one or more answers to the question. In some embodiments, QA system 100 may provide a response to users in a ranked list of answers.

The QA system may receive an input question which it then parses to extract the major features of the question, that in turn are then used to formulate queries that are applied to the corpus of data. Based on the application of the queries to the corpus of data, a set of hypotheses, or candidate answers to the input question, are generated by looking across the corpus of data for portions of the corpus of data that have some potential for containing a valuable response to the input question.

The QA system then performs deep analysis on the language of the input question and the language used in each of the portions of the corpus of data found during the application of the queries using a variety of reasoning algorithms. There may be hundreds or even thousands of reasoning algorithms applied, each of which performs different analysis, e.g., comparisons, and generates a score. For example, some reasoning algorithms may look at the matching of terms and synonyms within the language of the input question and the found portions of the corpus of data. Other reasoning algorithms may look at temporal or spatial features in the language, while others may evaluate the source of the portion of the corpus of data and evaluate its veracity.

The scores obtained from the various reasoning algorithms indicate the extent to which the potential response is inferred by the input question based on the specific area of focus of that reasoning algorithm. Each resulting score is then weighted against a statistical model. The statistical model captures how well the reasoning algorithm performed at establishing the inference between two similar passages for a particular domain during the training period of the QA system. The statistical model may then be used to summarize a level of confidence that the QA system has regarding the evidence that the potential response, i.e. candidate answer, is inferred by the question. This process may be repeated for each of the candidate answers until the QA system identifies candidate answers that surface as being significantly stronger than others and thus, generates a final answer, or ranked set of answers, for the input question.

Types of information handling systems that can utilize QA system 100 range from small handheld devices, such as handheld computer/mobile telephone 110 to large mainframe systems, such as mainframe computer 170. Examples of handheld computer 110 include personal digital assistants (PDAs), personal entertainment devices, such as MP3 players, portable televisions, and compact disc players. Other examples of information handling systems include pen, or tablet, computer 120, laptop, or notebook, computer 130, personal computer system 150, and server 160. As shown, the various information handling systems can be networked together using computer network 102. Types of computer network 102 that can be used to interconnect the various information handling systems include Local Area Networks (LANs), Wireless Local Area Networks (WLANs), the Internet, the Public Switched Telephone Network (PSTN), other wireless networks, and any other network topology that can be used to interconnect the information handling systems. Many of the information handling systems include nonvolatile data stores, such as hard drives and/or nonvolatile memory. Some of the information handling systems shown in FIG. 1 depicts separate nonvolatile data stores (server 160 utilizes nonvolatile data store 165, and mainframe computer 170 utilizes nonvolatile data store 175. The nonvolatile data store can be a component that is external to the various information handling systems or can be internal to one of the information handling systems. An illustrative example of an information handling system showing an exemplary processor and various components commonly accessed by the processor is shown in FIG. 2.

Figure 2:
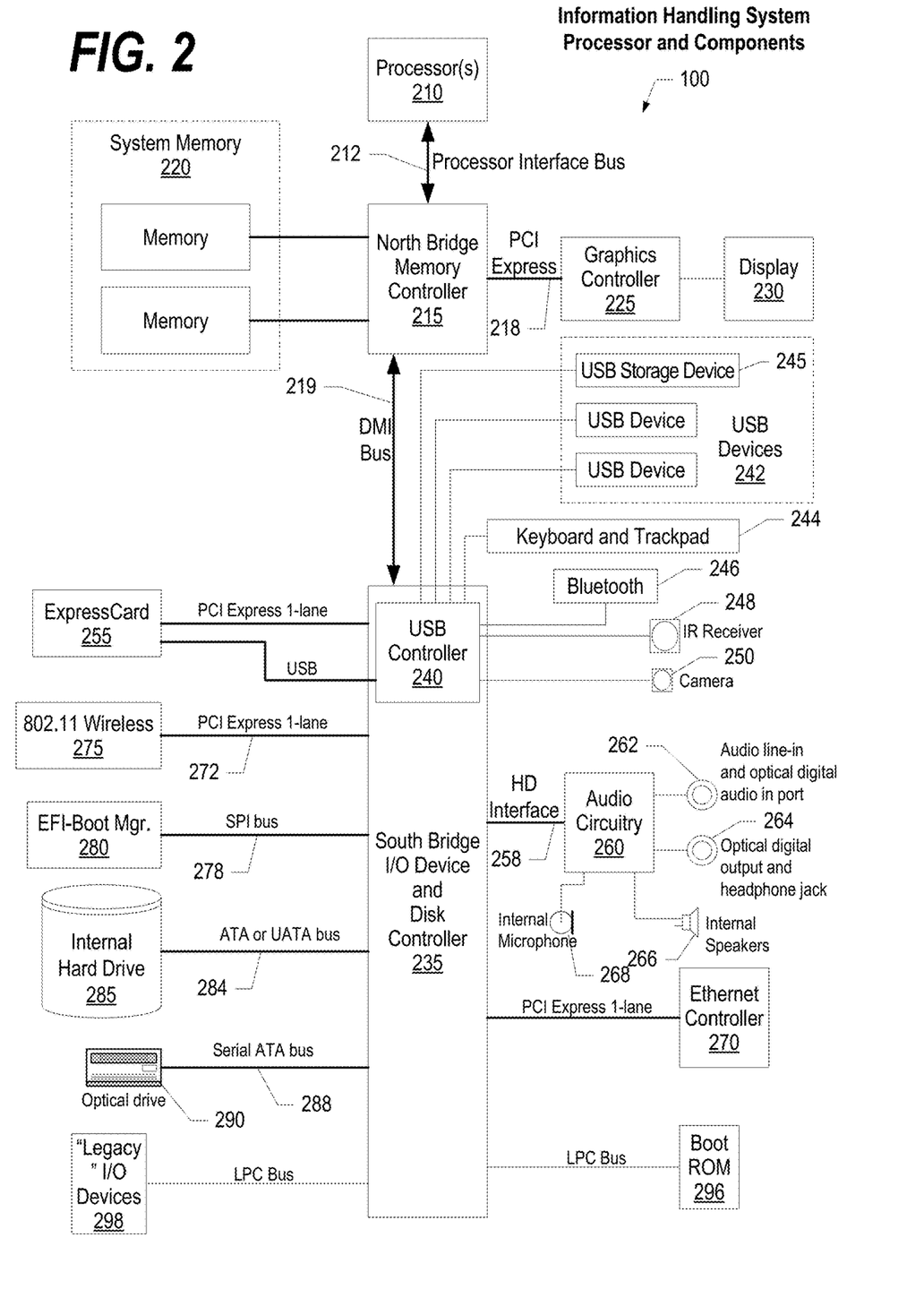
FIG. 2 is a block diagram of a processor and components of an information handling system such as those shown in FIG. 1.

FIG. 2 illustrates information handling system 200, more particularly, a processor and common components, which is a simplified example of a computer system capable of performing the computing operations described herein. Information handling system 200 includes one or more processors 210 coupled to processor interface bus 212. Processor interface bus 212 connects processors 210 to Northbridge 215, which is also known as the Memory Controller Hub (MCH). Northbridge 215 connects to system memory 220 and provides a means for processor(s) 210 to access the system memory. Graphics controller 225 also connects to Northbridge 215. In one embodiment, PCI Express bus 218 connects Northbridge 215 to graphics controller 225. Graphics controller 225 connects to display device 230, such as a computer monitor.

Northbridge 215 and Southbridge 235 connect to each other using bus 219. In one embodiment, the bus is a Direct Media Interface (DMI) bus that transfers data at high speeds in each direction between Northbridge 215 and Southbridge 235. In another embodiment, a Peripheral Component Interconnect (PCI) bus connects the Northbridge and the Southbridge. Southbridge 235, also known as the I/O Controller Hub (ICH) is a chip that generally implements capabilities that operate at slower speeds than the capabilities provided by the Northbridge. Southbridge 235 typically provides various busses used to connect various components. These busses include, for example, PCI and PCI Express busses, an ISA bus, a System Management Bus (SMBus or SMB), and/or a Low Pin Count (LPC) bus. The LPC bus often connects low-bandwidth devices, such as boot ROM 296 and "legacy" I/O devices (using a "super I/O" chip). The "legacy" I/O devices (298) can include, for example, serial and parallel ports, keyboard, mouse, and/or a floppy disk controller. The LPC bus also connects Southbridge 235 to Trusted Platform Module (TPM) 295. Other components often included in Southbridge 235 include a Direct Memory Access (DMA) controller, a Programmable Interrupt Controller (PIC), and a storage device controller, which connects Southbridge 235 to nonvolatile storage device 285, such as a hard disk drive, using bus 284.

ExpressCard 255 is a slot that connects hot-pluggable devices to the information handling system. ExpressCard 255 supports both PCI Express and USB connectivity as it connects to Southbridge 235 using both the Universal Serial Bus (USB) the PCI Express bus. Southbridge 235 includes USB Controller 240 that provides USB connectivity to devices that connect to the USB. These devices include webcam (camera) 250, infrared (IR) receiver 248, keyboard and trackpad 244, and Bluetooth device 246, which provides for wireless personal area networks (PANs). USB Controller 240 also provides USB connectivity to other miscellaneous USB connected devices 242, such as a mouse, removable nonvolatile storage device 245, modems, network cards, ISDN connectors, fax, printers, USB hubs, and many other types of USB connected devices. While removable nonvolatile storage device 245 is shown as a USB-connected device, removable nonvolatile storage device 245 could be connected using a different interface, such as a Firewire interface, etcetera.

Wireless Local Area Network (LAN) device 275 connects to Southbridge 235 via the PCI or PCI Express bus 272. LAN device 275 typically implements one of the IEEE 802.11 standards of over-the-air modulation techniques that all use the same protocol to wireless communicate between information handling system 200 and another computer system or device. Optical storage device 290 connects to Southbridge 235 using Serial ATA (SATA) bus 288. Serial ATA adapters and devices communicate over a high-speed serial link. The Serial ATA bus also connects Southbridge 235 to other forms of storage devices, such as hard disk drives. Audio circuitry 260, such as a sound card, connects to Southbridge 235 via bus 258. Audio circuitry 260 also provides functionality such as audio line-in and optical digital audio in port 262, optical digital output and headphone jack 264, internal speakers 266, and internal microphone 268. Ethernet controller 270 connects to Southbridge 235 using a bus, such as the PCI or PCI Express bus. Ethernet controller 270 connects information handling system 200 to a computer network, such as a Local Area Network (LAN), the Internet, and other public and private computer networks.

While FIG. 2 shows one information handling system, an information handling system may take many forms, some of which are shown in FIG. 1. For example, an information handling system may take the form of a desktop, server, portable, laptop, notebook, or other form factor computer or data processing system. In addition, an information handling system may take other form factors such as a personal digital assistant (PDA), a gaming device, ATM machine, a portable telephone device, a communication device or other devices that include a processor and memory.

Figure 3:
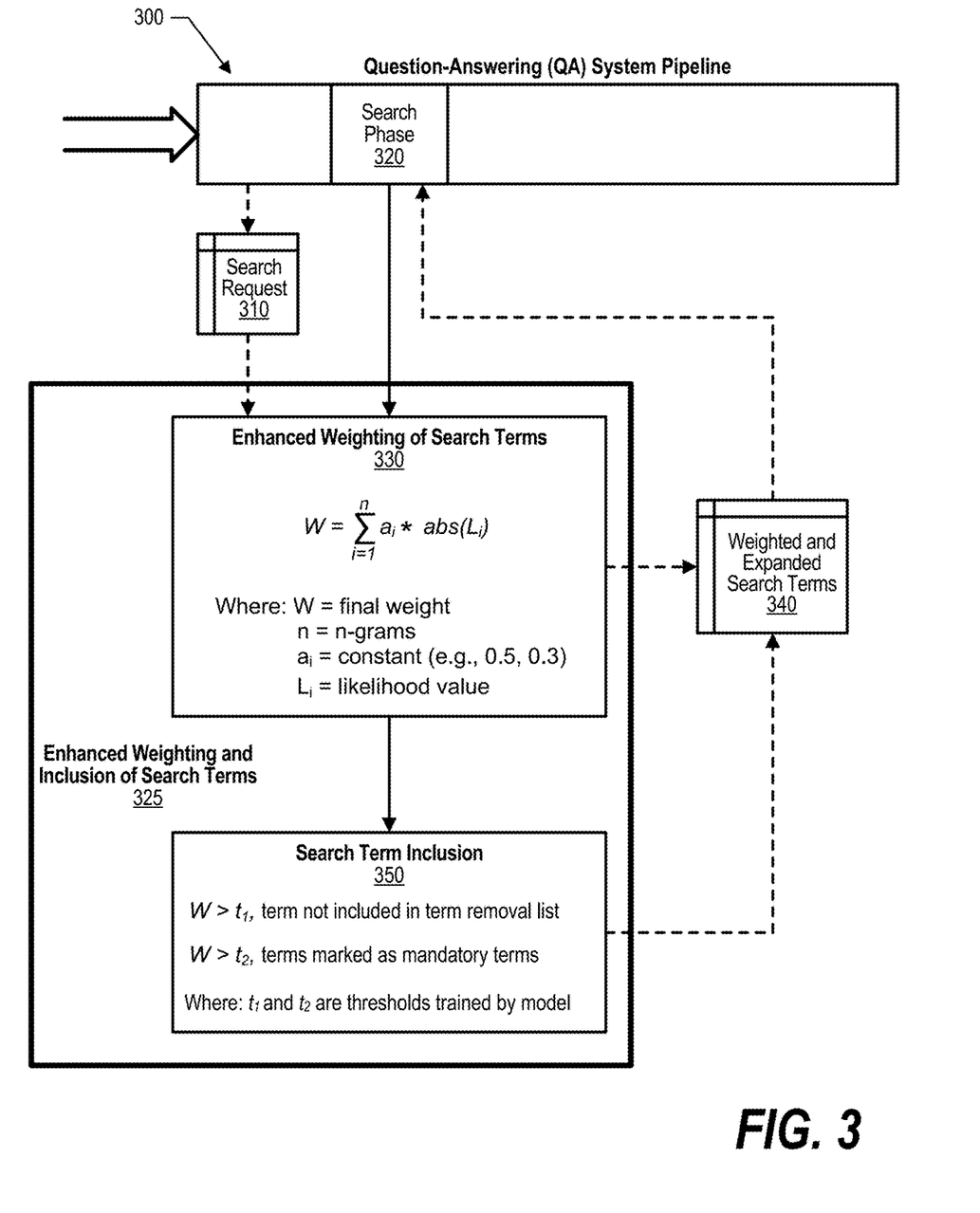
FIG. 3 is a high level diagram that depicts enhanced weighting and inclusion of search terms.

FIG. 3 is a high level diagram that depicts enhanced weighting and inclusion of search terms. A question answering (QA) system utilizes pipeline 300 to process a given question, often posed using natural language, to ultimately provide one or more responsive answers to the question. QA system pipeline 300 is comprised of a number of phases. One of the initial phases receives the search request from the requestor, such as an end user, with this search request being stored in memory area 310. Another phase in QA system pipeline 300 is search phase 320 during which a search is formulated with such formulated search being processed by the QA system against a knowledge base, or corpus, that is managed by the QA system. The approach described herein is an improvement to search phase 320 of QA system pipeline 300. In particular, the approach provides enhanced weighting and inclusion of search terms. Enhanced weighting of search terms (process 330) utilizes the algorithm shown in process 330 to provide enhanced weighting of search terms which can include unigrams (single words found in the search request), bigrams (two words found adjacent to one another in the search request), trigrams (three words found adjacent to one another in the search request, and so on.

The approach processes n-gram models using the algorithm shown below, where W=the weight of the term, n=the number of grams, $\alpha_i$=constant value for gram (i), and $L_i$=the likelihood of the term (likelihood of single word for unigram, two adjacent words for bigram, etc.).

$$W = \sum_{i=1}^{n} \alpha_i * \text{abs}(L_i)$$

For any given corpus, the constants to use can be determined by training and testing based on the documents in the corpus (document database).

Search term inclusion process 350 provides two thresholds that are used ($t_1$ and $t_2$) so that if a term exceeds (is greater than) the first threshold ($t_1$) then the approach ensures that the term is not removed by a stop list (e.g., list of words commonly removed from a search, etc.). If the term exceeds the second threshold ($t_2$), then the approach ensures that the term is included as a mandatory term in the search.

The idea behind this approach is if unlikely words are in a question (relative to works preceding them), they may be particular relevant and boosted in a variety of ways. The weights are calculated using the formula above based on log likelihood. These weights are added to the Lucene query. The resulting weighted and expanded search terms are stored in memory area 340 and are used by the QA system in further QA system pipeline phases to search documents and passages maintained by the QA system.

Figure 4:
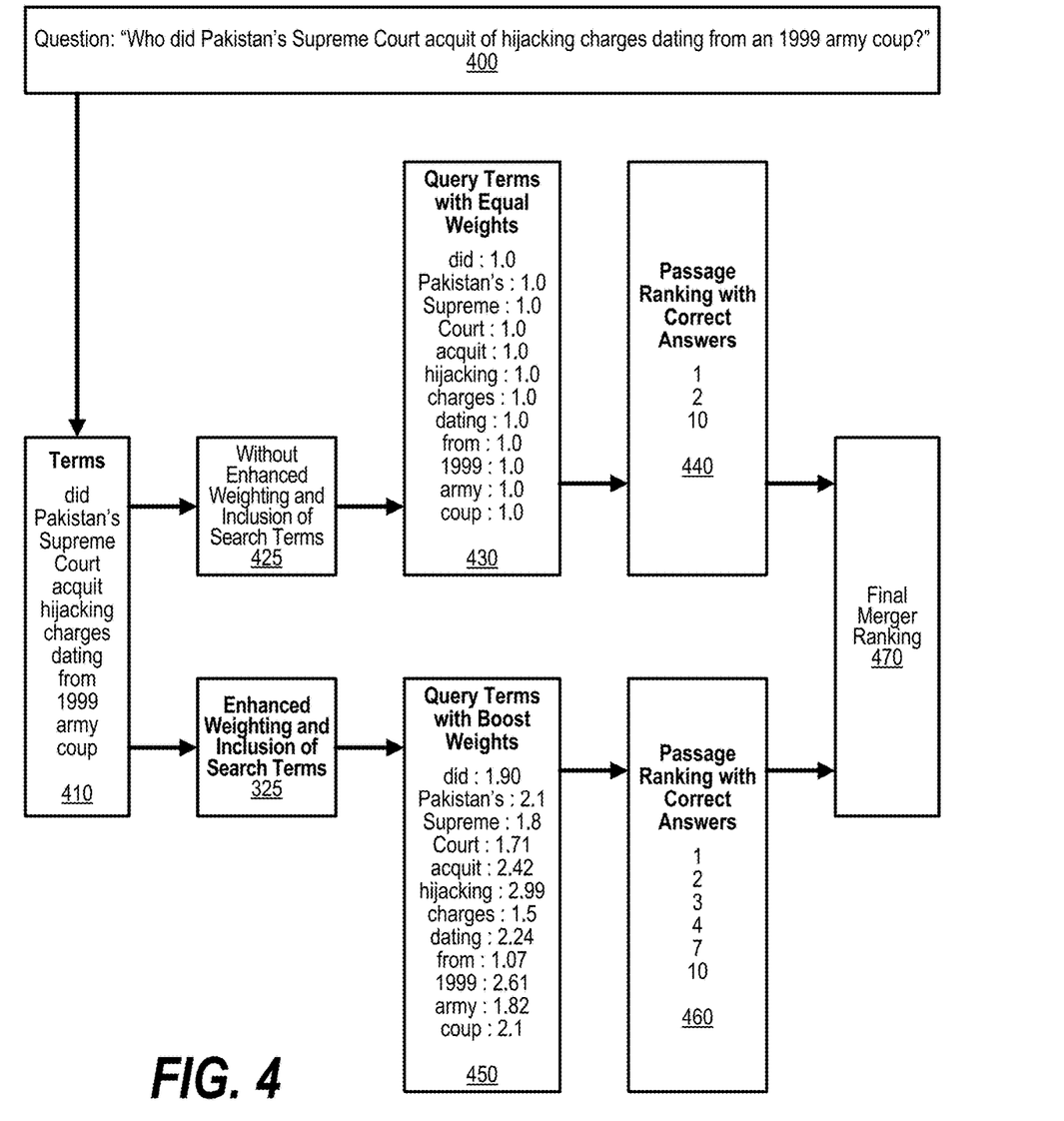
FIG. 4 is a diagram showing a first example of a comparison of weighted query terms using traditional weighting and inclusion of search terms and query terms boosted with enhanced weighting and inclusion of search terms.

FIG. 4 is a diagram showing a first example of a comparison of weighted query terms using traditional weighting and inclusion of search terms and query terms boosted with enhanced weighting and inclusion of search terms. In this first example, question 400 is being posed "Who did Pakistan's Supreme Court acquit of hijacking charges dating from an 1999 army coup?" The unigram (single word) terms in the search are shown in box 410. For comparison purposes, the words are shown being processed by both the traditional approach (process 425) as well as by the enhanced weighting and inclusion of search terms process 325. Box 430 shows the query terms, in this case unigrams, all having equal weights as is the result of traditional approaches that do not utilize enhanced weighting and inclusion of search terms. Note that the weights pertaining to each of the words in box 430 is the same value (1.0). In contrast, box 450 shows the same terms with boosted weights that result from enhanced weighting process 325. The queries resulting from query terms 430 and 450, respectively, also differ due to the enhanced weighting that was provided with process 325 instead of equal weighting process 425.

Passages returned by queries using the respective query terms, in the example, show that only three passages with correct answers were returned using the traditional approach (ranked passages 1, 2, and 10) as depicted in box 440, while the query with boosted weights resulting in six passages with correct answers (ranked passages 1, 2, 3, 4, 7, and 10) as depicted in box 460. In other words, if the correct answer is actually in one of the passages not returned by the traditional ranking (e.g., ranked passages 3, 4, or 7), then the traditional approach would not have the correct answer to pass to final merger ranking process 470, while the process described herein using enhanced weighting would return these three passages to final merger ranking process 470.

Figure 5:
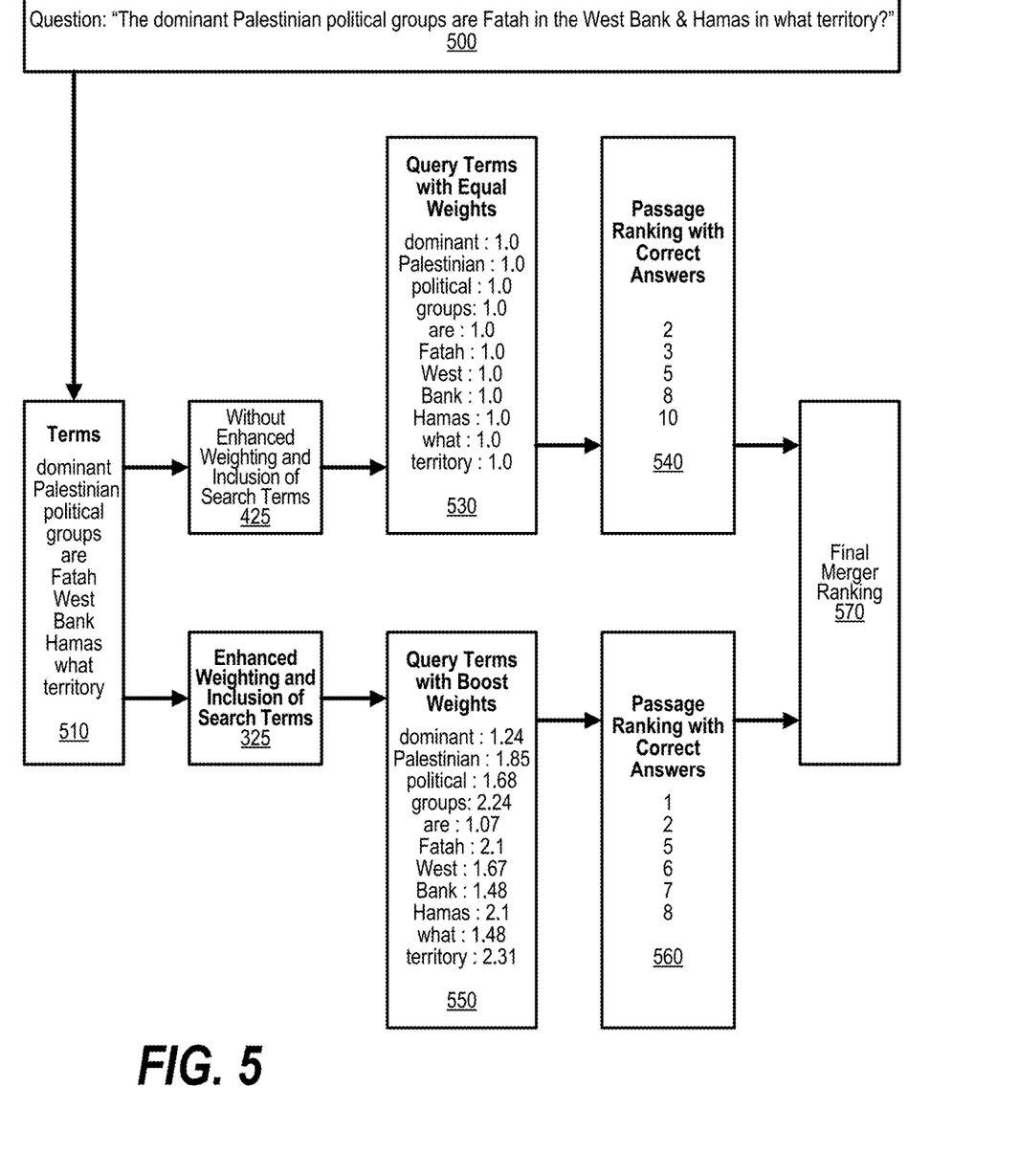
FIG. 5 is a diagram showing a second example of a comparison of weighted query terms using traditional weighting and inclusion of search terms and query terms boosted with enhanced weighting and inclusion of search terms.

FIG. 5 is a diagram showing a second example of a comparison of weighted query terms using traditional weighting and inclusion of search terms and query terms boosted with enhanced weighting and inclusion of search terms. In this first example, question 500 is being posed "The dominant Palestinian political groups are Fatah in the West Bank & Hamas in what territory?" The unigram (single word) terms in the search are shown in box 510. For comparison purposes, the words are shown being processed by both the traditional approach (process 425) as well as by the enhanced weighting and inclusion of search terms process 325. Box 530 shows the query terms, in this case unigrams, all having equal weights as is the result of traditional approaches that do not utilize enhanced weighting and inclusion of search terms. Note that the weights pertaining to each of the words in box 530 is the same value (1.0). In contrast, box 550 shows the same terms with boosted weights that result from enhanced weighting process 325. The queries resulting from query terms 530 and 550, respectively, also differ due to the enhanced weighting that was provided with process 325 instead of equal weighting process 425.

Passages returned by queries using the respective query terms, in the example, show that five passages with correct answers were returned using the traditional approach (ranked passages 2, 3, 5, 8, and 10) as depicted in box 540, while the query with boosted weights resulting in six passages with correct answers (ranked passages 1, 2, 5, 6, 7, and 8) as depicted in box 560. While some of the ranked passages returned with each approach overlap (2, 5, and 8), the traditional approach appears to have returned an extraneous passage (passage 10), while not including relevant ranked passages 1 and 6 that were returned using the enhanced weighting of terms provided by process 325. In other words, if the correct answer is actually in one of the passages not returned by the traditional ranking (e.g., ranked passages 1 or 6), then the traditional approach would not have the correct answer to pass to final merger ranking process 570, while the process described herein using enhanced weighting would return these three passages to final merger ranking process 570. In addition, ranked passage 10 (included by equal weighting approach 425 but not enhanced weighting process 325) might have misleading information that could result in the equal weighting process returning an incorrect answer if passage 10 is relied upon during final merger ranking process 570.

Figure 6:
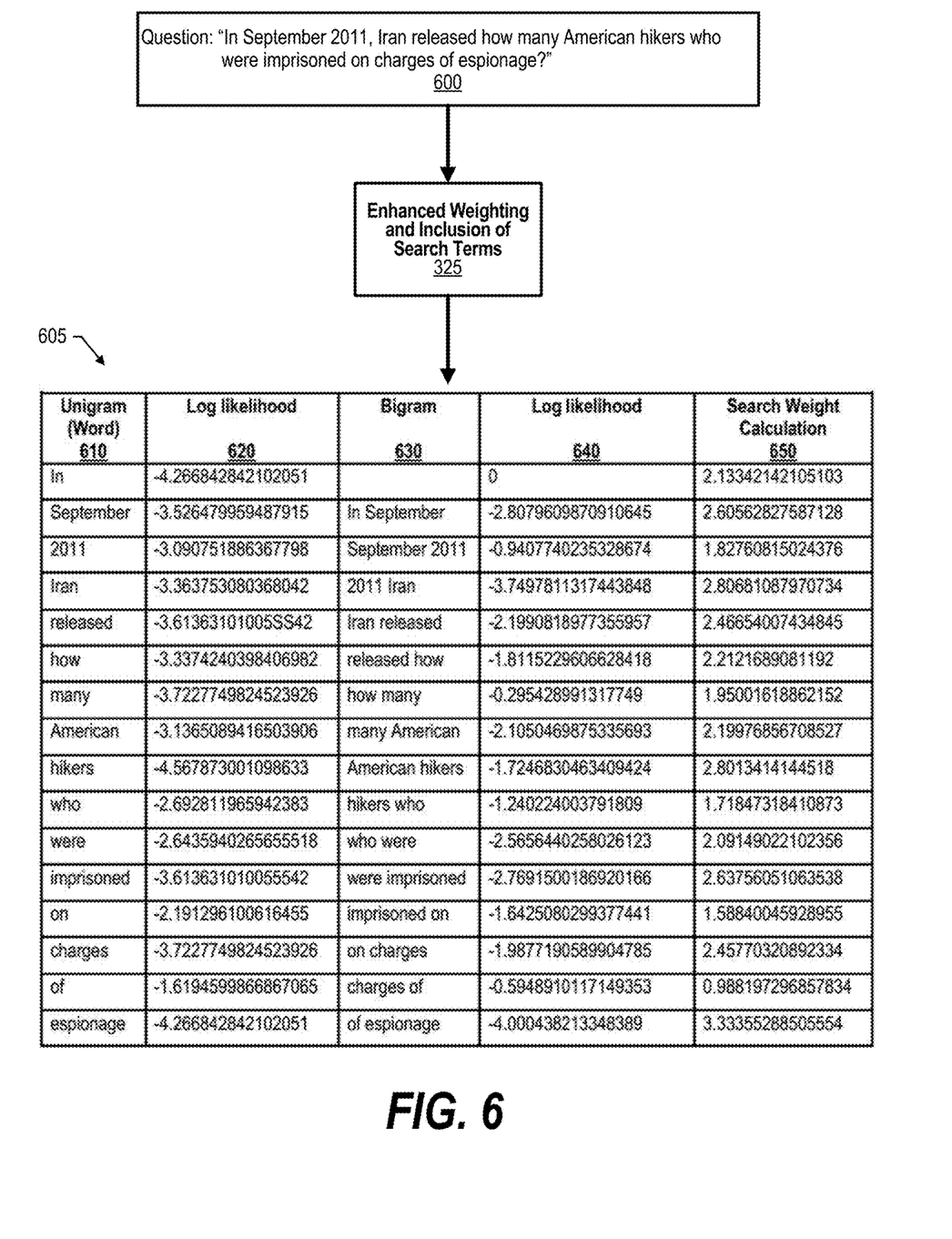
FIG. 6 is a depiction of a search weight calculation of terms included in a third example question posed to a QA system using enhanced weighting and inclusion of search terms.

FIG. 6 is a depiction of a search weight calculation of terms included in a third example question posed to a QA system using enhanced weighting and inclusion of search terms. In contrast to the examples shown in FIGS. 4 and 5, FIG. 6 is also depicting bigram search terms, which are the sets of adjacent words found in the question.

In this example, question 600 is posed to the QA system with the question being, "In September 2011, Iran released how many American hikers who were imprisoned on charges of espionage?" Enhanced weighting and inclusion of search terms process 325 process the question resulting in the data shown in table 605.

Table 605 is shown with five columns of data—unigram, or word, data in column 610 which is each word individually. Log likelihood column 620 depicts the likelihood of the corresponding unigram (word) occurring with such values being retrieved from a separate data store of log likelihood values. Bigrams, which are sets of two adjacent words, are shown in column 630 with the respective log likelihoods of such bigrams being depicted in column 640. Finally, search weight calculation 650 processes the data shown in the respective row using the aforementioned algorithm which is reproduced below:

$$W = \sum_{i=1}^{n} \alpha_i * \text{abs}(L_i)$$

The constants used in the equation above for the corpus being processed are $\alpha_1$ (constant for unigrams) being set to 0.5, and $\alpha_2$ (constant for bigrams) being set to 0.3. The resulting search weight calculations using the above algorithm and constants for the respective terms in each row are shown in column 650.

Figure 7:
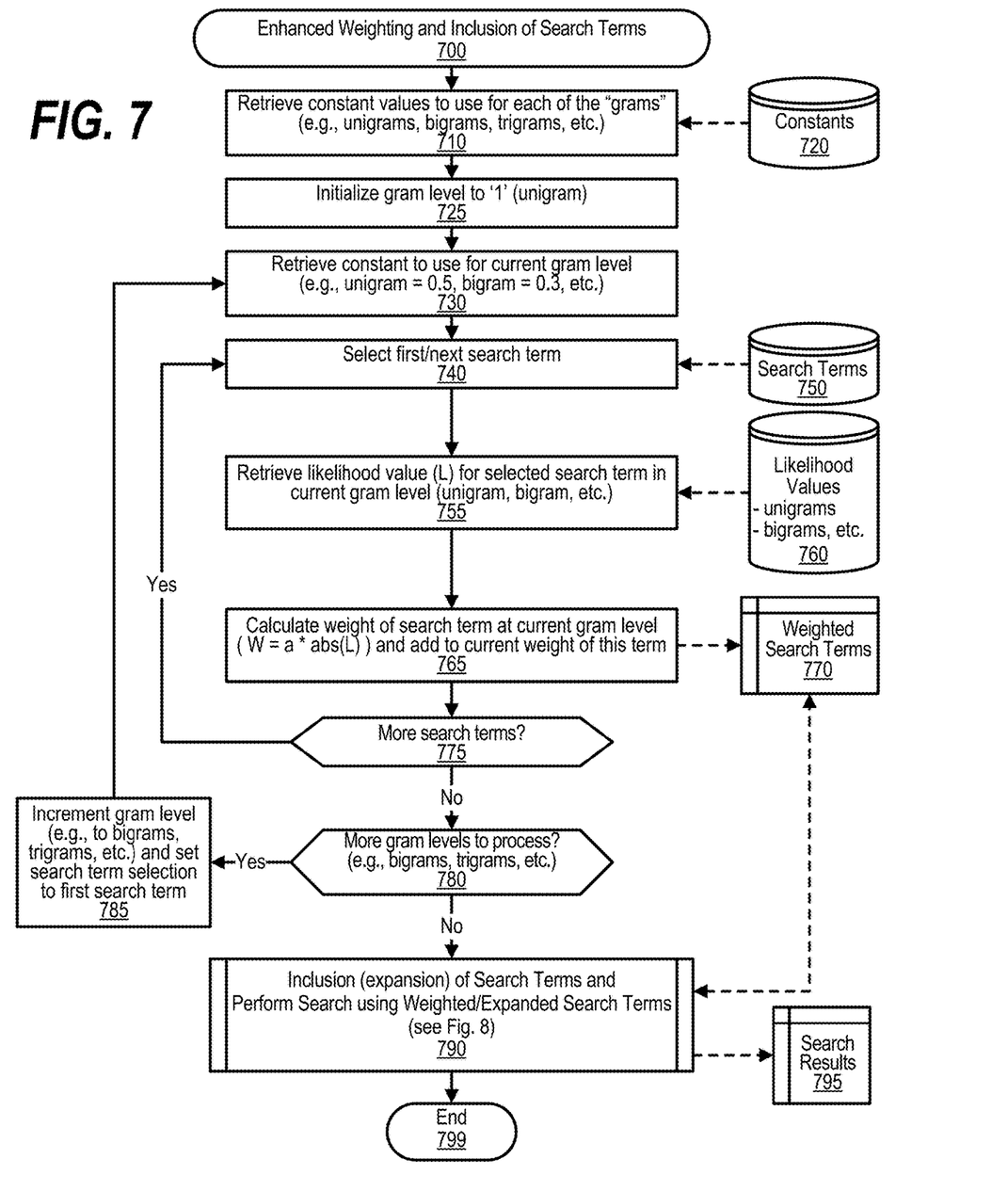
FIG. 7 is a depiction of a flowchart showing the logic used to compute enhanced weighting and inclusion of search terms for a given search.

FIG. 7 is a depiction of a flowchart showing the logic used to compute enhanced weighting and inclusion of search terms for a given search. FIG. 7 processing commences at 700 and shows the steps taken by a process that calculates enhanced weighting and inclusion of search terms found in a given question. At step 710, the process retrieves the constant values for the given application (e.g., corpus, etc.) to use for each of the "n-grams" (e.g., unigrams, bigrams, trigrams, etc.). The constants used for the various grams are retrieved from data store 720. At step 725, the process initializes the current n-gram level to '1' (unigram). At step 730, the process retrieves the constant to use for current gram level (e.g., unigram=0.5, bigram=0.3, etc.).

At step 740, the process selects the first search term from data store 750 (e.g., example column 610 for unigram terms and 630 for bigram terms from table 605 depicted in FIG. 6). At step 755, the process retrieves log likelihood value (L) for selected search term in current gram level (unigram, bigram, etc.) from data store 760. For example, the log likelihood values depicted in example columns 620 for unigram likelihood values and 640 for bigram likelihood values from table 605 depicted in FIG. 6). At step 765, the process calculates weight of search term at current gram level (W=a*abs(L)) and adds the result to the current weight of this term which is stored in memory area 770. For example, the calculation results depicted in example column 650 from table 605 depicted in FIG. 6). The process determines as to whether there are more search terms that need to be processed for the current n-gram level (decision 775). If there are more search terms that need to be processed for the current n-gram level, then decision 775 branches to the 'yes' branch which loops back to step 740 to select and process the next search term as described above. This looping continues until all of the search terms have been processed for the current n-gram level, at which point decision 775 branches to the 'no' branch exiting the loop.

The process next determines whether there are more gram levels to process (decision 780). For example, if both unigrams and bigrams are being processed and processing has completed the unigram processing (1-gram), then processing would loop in order to process the bigrams (2-grams). If there are more gram levels to process, then decision 780 branches to the 'yes' branch which branches to step 785 to increment the current gram level (e.g., to bigrams, trigrams, etc.) and also sets the search term selection to first search term before loops back to step 730 to process the search terms using the newly set gram level. This looping continues until all of the gram levels have been processed, at which point decision 780 branches to the 'no' branch exiting the loop. At predefined process 790, the process performs the Inclusion of Search Terms and Perform Search Using Weighted/Expanded Search Terms routine (see FIG. 8 and corresponding text for processing details). The search results are returned by predefined process 790 and stored in memory area 795. FIG. 7 processing thereafter ends at 799.

Figure 8:
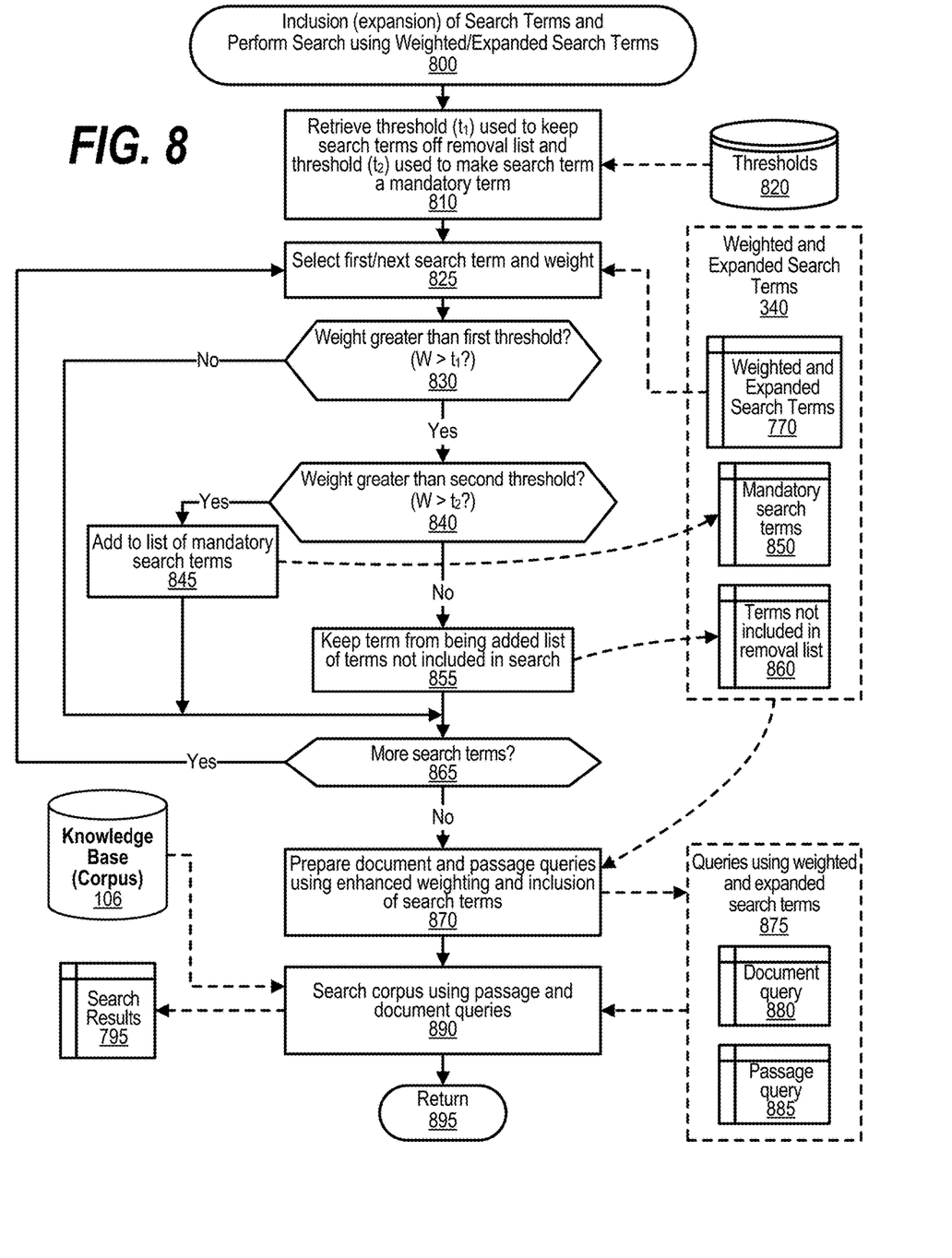
FIG. 8 is a depiction of a flowchart showing the logic used to expand search terms used in query based on enhanced weighting and inclusion of search terms.

FIG. 8 is a depiction of a flowchart showing the logic used to expand search terms used in query based on enhanced weighting and inclusion of search terms. FIG. 8 processing commences at 800 and shows the steps taken by a process that includes (expands) search terms based on enhanced weighting applied to the search terms and also perform a search of the corpus using the weighted and expanded search terms. At step 810, the process retrieves a first threshold ($t_1$) that is used in comparing to search term weights to keep search terms off of the removal list and a second threshold ($t_2$) that is used in comparing to such search terms to make certain terms mandatory search terms in the eventual search. The first and second threshold values are retrieved from data store 820.

At step 825, the process selects the first search term and its corresponding weight from memory area 770. The process then determines whether the selected search term's weight is greater than the first threshold value (decision 830). If the selected search term's weight is greater than the first threshold value, then decision 830 branches to the 'yes' branch to further evaluate the search term's weight. On the other hand, if the selected search term's weight is not greater than the first threshold value, then decision 830 branches to the 'no' branch bypassing the remaining search term evaluation steps. The process next determines whether the selected search term's weight is greater than the second threshold (decision 840). If the selected search term's weight is greater than the second threshold, then decision 840 branches to the 'yes' branch whereupon, at step 845, the process adds the selected search term to a list of mandatory search terms that are stored in memory area 850. On the other hand, if the selected search term's weight is less than or equal to the second threshold (but still greater than the first threshold), then decision 840 branches to the 'no' branch whereupon, at step 855 the process keeps, or inhibits, the selected search term from being added to a list of terms not included in (removed from) the search by adding the selected term to memory area 860. The process determines as to whether there are more search terms to select and process as described above (decision 865). If there are more search terms to select and process, then decision 865 branches to the 'yes' branch which loops back to step 825 to select and process the next search term using the next search term's weight value. This looping continues until all of the search terms have been processed, at which point decision 865 branches to the 'no' branch exiting the loop.

At step 870, the process prepares the document and passage queries using both the enhanced weighting of the search terms as well as the enhanced inclusion of search terms as provided by steps 825 through 865. Queries using weighted and expanded search terms 875 include document query 880 as well as passage query 885. At step 890, the process searches the knowledge base (corpus 106) using the prepared passage query 880 and document query 885. The results of the search are stored in memory area 795, where they can be provided to the requestor, such as an end user or another process that requested the search. FIG. 8 processing thereafter returns to the calling routine (see FIG. 7) at 895.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A method implemented by an information handling system that includes a processor and a memory accessible by the processor, the method comprising:
   receiving a question at a question answering (QA) system that includes a plurality of words comprising a first word and a second word adjacent to the first word;
   retrieving a first log likelihood value corresponding to the first word, wherein the first log likelihood value is a derivative of a first probability that the first word resides in an n-gram corpus;
   retrieving a second log likelihood value corresponding to a phrase comprising the first word and the second word, wherein the second log likelihood value is a derivative of a second probability that the phrase comprising the first word and the second word resides in the n-gram corpus;
   calculating a weighting of the first word based on the first log likelihood value and the second log likelihood value;
   in response to determining that the weighting of the first word meets a first threshold:
      detecting that the first word is included in a list of removable common words to remove from one or more queries; and
      updating the list of removable common words by removing the first word from the list of removable common words;
   generating one of the one or more queries based on the question, the updated list of removable common words, and the calculated weighting; and
   searching, using the generated query, a corpus managed by the QA system, wherein the searching results in one or more search results.

2. The method of claim 1 further comprising:
   retrieving a unigram constant value corresponding to the first word;
   calculating a unigram weight corresponding to the first word using the unigram constant value and the first log likelihood value; and
   using the unigram weight during the calculating of the weighting.

3. The method of claim 2 wherein the calculating further comprises:
   multiplying the unigram constant value by an absolute value of the first log likelihood value.

4. The method of claim 1 further comprising:
   retrieving a bigram constant value;
   calculating a bigram weight corresponding to the phrase comprising the first word and the second word using the bigram constant value and the second log likelihood value; and
   using the bigram weight during the calculating of the weighting.

* * * * *